United States Patent
Meiβner et al.

(10) Patent No.: US 9,573,272 B2
(45) Date of Patent: Feb. 21, 2017

(54) OPERATING METHOD FOR A POSITIONING SYSTEM

(71) Applicant: Dürr Systems GmbH, Bietigheim-Bissingen (DE)

(72) Inventors: Alexander Meiβner, Stuttgart (DE); Jens Häcker, Markgröningen (DE); Dirk Poppe, Ölbronn-Dürrn (DE); Nihat Biyiklioglu, Vaihingen/Enz (DE); Taoufik Mbarek, Würselen (DE)

(73) Assignee: BA Assembly & Turnkey Systems GmbH, Wiefelstede (DE)

( * ) Notice: Subject to any disclaimer, the term of this patent is extended or adjusted under 35 U.S.C. 154(b) by 182 days.

(21) Appl. No.: 14/352,818

(22) PCT Filed: Oct. 15, 2012

(86) PCT No.: PCT/EP2012/004308
§ 371 (c)(1),
(2) Date: Apr. 18, 2014

(87) PCT Pub. No.: WO2013/056806
PCT Pub. Date: Apr. 25, 2013

(65) Prior Publication Data
US 2014/0288695 A1   Sep. 25, 2014

(30) Foreign Application Priority Data

Oct. 19, 2011 (DE) .................. 10 2011 116 437

(51) Int. Cl.
*G06F 7/00* (2006.01)
*B25J 9/00* (2006.01)
(Continued)

(52) U.S. Cl.
CPC .............. *B25J 9/0084* (2013.01); *B23P 21/00* (2013.01); *B25J 9/1682* (2013.01); *B64F 5/0009* (2013.01);
(Continued)

(58) Field of Classification Search
USPC ........................................................ 700/213
See application file for complete search history.

(56) References Cited

U.S. PATENT DOCUMENTS

| 2006/0069466 A1* | 3/2006 | Kato ...................... B25J 9/1682 700/264 |
| 2010/0135754 A1 | 6/2010 | Weber |

(Continued)

FOREIGN PATENT DOCUMENTS

| DE | 102004056285 | 5/2006 |
| DE | 102006011341 | 9/2007 |

(Continued)

OTHER PUBLICATIONS

R. Muller et al. "Durchgangige Modularitat von der mechanik bis zur Bahnplanung," Werkstattstechnik Online, vol. 100, Nr. 5, pp. 413-417 (2010).

(Continued)

*Primary Examiner* — Kyle Logan
(74) *Attorney, Agent, or Firm* — Bejin Bieneman PLC (57) ABSTRACT

The invention relates to an operating method for a positioning system 1, in particular for the structural assembly of aircraft, wherein the positioning system 1 comprises a plurality of positioners 2a, 2b, 2c, each of which has at least one manipulator M. The manipulators M grasp a component B and manipulate it in a synchronized manner, while it is jointly grasped by the manipulators M.

20 Claims, 7 Drawing Sheets

(51) Int. Cl.
   *B25J 9/16* (2006.01)
   *B64F 5/00* (2006.01)
   *B23P 21/00* (2006.01)
(52) U.S. Cl.
   CPC ............... *G05B 2219/32285* (2013.01); *G05B 2219/39121* (2013.01); *G05B 2219/40417* (2013.01); *G05B 2219/45071* (2013.01); *Y10T 29/49826* (2015.01)

(56) References Cited

U.S. PATENT DOCUMENTS

| | | | | |
|---|---|---|---|---|
| 2012/0116585 | A1* | 5/2012 | Yoshima | B23K 9/1062 700/248 |
| 2012/0130528 | A1* | 5/2012 | Stark | B23P 19/10 700/114 |

FOREIGN PATENT DOCUMENTS

| | | |
|---|---|---|
| DE | 202008009987 | 12/2009 |
| DE | 102008062026 | 6/2010 |
| DE | 102009018991 | 11/2010 |
| DE | 102011111758 | 2/2013 |

OTHER PUBLICATIONS

R. Muller "Modulare Architektur eines rekonfigurierbaren robotischen Systems zur Montage von Faserverbundstruck-turen," DLR Wissenschaftstag 2011—Die Verbundprozess—Technologie Fur CFK—Hochleistungsstrukturne, pp. 1-27 (2011).

J. Wollnack "3D/6D-Visionsysteme und Lasermessverfahren in der Luftfahrtindustrie," Zeitschriften AVN—Allegemeine Vermessungs-Nachrichten, Edition 5, pp. 175-187 (2009).

J. Kurth "Flexible Produktionssysteme durch kooperierende Roboter" WT Werkstattstechnik Onine, vol. 95, Nr. 3, pp. 81-84 (2005).

G. Reinhart et al. "A Generic Framework for Workpice-based Programming of Cooperating Industrial Robots" Proceedings of HTE 2009 IEEE International Conference on Mechantronics and Automation, pp. 37-42 (2009).

DLR Stade: Einladung um Wissenschaftstag 2011 am Sep. 29, 2011.

* cited by examiner

PK: TCP coordinate system of a slave kinematics (SK) linked to a master kinematics (MK) at point P QMK: TCP coordinate system of MK at point Q TK=MK: Transformation of the TCP coordinate system of SK into TCP coordinate system of MK. This transformation is defined, for example, in Fig. 3, Step 4

TMK: Movement, in particular translation and rotation, of MK-TCP coordinate system from point Q to point Q'

TK: Resulting transformation of TCP coordinate system of SK coupled to the MK from point P to point P'

TCP coordinate system of SK always follows the TCP coordinate system of MK, while TK->MK is fixed, as shown e.g. in Fig. 3, Step 5

OPERATING METHOD FOR A POSITIONING SYSTEM

CROSS-REFERENCE TO RELATED APPLICATIONS

The subject patent application claims priority to and all the benefits of International Patent application No. PCT/EP2012/004308 filed on Oct. 15, 2012, which claims priority to German Patent Application No. DE 10 2011 116 437.9 filed on Oct. 19, 2011, both of which are herein incorporated by reference in their entirety.

BACKGROUND AND SUMMARY

An operating method for a positioning system advantageously comprises a plurality of positioners, each of which may have at least one manipulator for manipulating a component. A possible use is the structural assembly of aircraft wherein shell segments are assembled into fuselage sections, the fuselage sections are then possibly positioned relative to one another and joined into a fuselage and subsequently, for example, the bearing structure, the empennages and the undercarriage are assembled onto the fuselage.

In conventional structural assemblies of aircraft in which components in the form of shell segments are assembled into fuselage sections, it is known that positioning takes place by means of rigid, heavy devices. Herein, a component can be inserted into a shape-defining frame. The component can be positioned together with the frame, relative to a reference system on a ring-shaped template, with the aid of the devices. The position of a device can then be detected periodically. With this assembly principle, the devices and, in particular, the frame, can suitably be designed with a high degree of stiffness. However, this has the disadvantage that, due to the design as a shape-defining frame, the degree of flexibility for component variants is limited.

It is also known to use coordinated positioning units for shell assembly. Herein, the shell segments can be received at defined receiving points by means of hot mountings and can be positioned relative to one another at support points with the aid of assembly devices. Depending on the dimensions of an aircraft to be assembled, for example, four to eight hot mountings can be applied to the shell segment. With this assembly principle, the position measurement of the shell segments can be a part of every assembly process. However, this configuration has the disadvantage that a very great effort is required for the control technology.

It is disclosed herein to provide an improved and/or alternative operating method for a positioning system.

An operating method is provided for a positioning system which advantageously comprises a plurality of positioners of which each has at least one, typically a plurality of manipulators. The positioning system is suitable for aircraft structural assembly, although the system can also be used for motor vehicle assembly (e.g. for bodywork parts, windows, etc.).

A component is grasped by manipulators and may be synchronously manipulated while being advantageously jointly grasped by the manipulators.

"Synchronous manipulation" should be understood to mean, in particular, the synchronisation of the movements of the manipulators.

It is possible for the manipulators to manipulate the component synchronously from an initial situation (initial position and/or initial orientation) into a target situation (target position and/or target orientation).

It is possible, in the absence of suitable countermeasures, for the component to have a deformation, for example, in the initial situation or generally, due to the intrinsic weight thereof. The component can therefore be, in particular, a flexionally flaccid component.

The component may be grasped in the initial situation by the manipulators and is manipulated by the manipulators into a desired form and/or held in a desired form.

The desired form may correspond to a form in which the deformation due to the intrinsic weight of the component and/or the internal tensions of the component are compensated for.

The deformation caused by the intrinsic weight of the component and/or the internal tensions of the component can be substantially completely, though not necessarily, compensated for. The present disclosure also covers only partial compensation.

The into-form manipulation or in-form holding can take place by means of specific manipulation of all the manipulators and/or by means of specific manipulation of only some of the manipulators. This means that not all the manipulators are necessarily needed to manipulate the component into the desired form and/or to hold the component in the desired form.

It is possible for the manipulators to transport the component to the target situation in the desired form at least in sections. It is possible herein, depending on the initial situation and the target situation and on the geometry of the component, that manipulators continuously manipulate the component at least in sections, between the initial situation and the target situation, such that the component is held in the desired form. In other words, it is therefore possible for the manipulators not only to manipulate the component in order to transport the component, but simultaneously also to hold the component in the desired form.

On the way from the initial situation to the target situation, the component is may be constantly held in the desired form by the manipulators. It is also possible for the component only to be manipulated into the desired form once in the target situation.

Using, for example, synchronous or asynchronous manipulation (e.g. coordinated manipulation), the manipulators can bring the component into, and/or hold the component in, the desired form.

As already mentioned, in the initial situation, the component can have a deformation due to the intrinsic weight thereof.

In one embodiment, the component is brought from a holding and/or transporting device (e.g. a crane construction) into the initial situation in which it is grasped (e.g. already in the desired form) and/or is manipulated into the desired form by the manipulators. It is possible for the manipulators to grasp the component already in the desired form. In this case, the holding and/or transporting device suitably holds the component already in the desired form. However, it is also possible for the manipulators to grasp a component deformed by the intrinsic weight thereof and to manipulate the component into the desired form. In this case, the holding and/or transporting device suitably holds the component not already in the desired form.

A transfer of the component from the holding and/or transporting device to the manipulators may take place in the initial situation.

The target situation can involve any desired situation (position and/or orientation), which is unlike an initial situation. The target situation can, but does not necessarily, relate to a final situation. The target situation may be an assembly situation in which the component can be mounted, for example, on an aircraft part. Similarly, the initial situation can, but does not necessarily, relate to a starting situation.

The manipulators may manipulate the component synchronously and independently of the operating situation, for example, a teaching, operational and/or emergency stop situation.

In one embodiment, a coordinate system (suitably a master coordinate system) is associated with the component and respective base coordinate systems (suitably, slave coordinate systems) are associated with the respective manipulators.

The operating method also may comprise at least one of the following features:
the position and/or orientation of the component in an initial situation are or have been determined,
the position and/or orientation of the component in a target situation are or have been determined,
reference movement parameters are or have been determined, the reference movement parameters relating to a coordinate system associated with the component and, for example, describing the movement of the component from the position and/or orientation in the initial situation to the position and/or orientation in the target situation, whereby a master kinematics may be defined,
the reference movement parameters are or have been transformed into the respective base coordinate system,
the manipulators manipulate the component based on the respective transformed reference movement parameters (suitably now relating to the respective base coordinate systems of the manipulators), whereby the respective manipulators may carry out a slave kinematics.

By this means, the respective base coordinate systems thus advantageously make reference to the coordinate system associated with the component, which may correspond to a 6-D coordinate system (3 position coordinates and 3 orientation coordinates).

Both the coordinate system associated with the component and the respective base coordinate systems of the manipulators suitably relate to reference points, in particular so-called "tool centre points" (TCP—"tool centre point" or "tool reference point"). The coordinate systems therefore include TCP coordinate systems.

The reference points of the respective base coordinate systems of the manipulators may be fixed relative to the respective manipulators, whereby the respective base coordinate systems move with the respective manipulators. Alternatively or additionally, the reference point of the coordinate system associated with the component can be fixed relative to the component, whereby the coordinate system associated with the component moves with the component.

It is possible that the respective base coordinate systems (or the reference points or TCPs thereof) of the manipulators always follow the coordinate system (or the reference point or TCP thereof) of the component, particularly while the transformation is fixed between the manipulators and the attachment points of the manipulators on the component and/or the transformation is fixed between the attachment points of the manipulators on the component and the master kinematics of the component defined by the reference movement parameters. The referencing suitably also relates to the slave kinematics of the manipulators and the master kinematics of the component.

The manipulators are may be linked to one and the same control and/or computation unit which can control the manipulators jointly, e.g., simultaneously.

In particular, for example, the synchronous manipulation or at least the start of the synchronous manipulation by the manipulators can be controlled by one and the same control and/or computation unit.

Furthermore, the reference movement parameters (suitably the master kinematics) and/or the respective transformed reference movement parameters (suitably the slave kinematics) can be contained in one and the same control and/or computation unit (e.g. therein stored, determined and/or processed, etc.).

It is possible for the manipulators to be synchronously linked via a master/slave interface.

The manipulators can be of the same or different design and can comprise e.g. linear, serial, Cartesian and hybrid manipulators. For example, the manipulators of one positioner can be of the same or different design. Similarly, the manipulators of different positioners can be of the same or different design.

The component may be a shell segment, for example, for an aircraft outer skin (e.g. a fuselage), which in the target situation is mounted, for example, onto another aircraft part. In this case, the target situation corresponds to an assembly situation.

It should also be noted that the manipulators can be moved, for example, individually or in groups. Furthermore, the manipulators can be configured, for example, single-axis or multi-axis. Furthermore, the manipulators can be moved synchronously, for example, cascaded. The positioners and/or manipulators can be, for example, conventional robots or other suitable handling devices.

It should also be noted that a synchronous correction of the kinematics of the manipulators can be carried out, for example, depending on the deflection and/or bending of the linear axes of the manipulators and/or the measured load at the grasping points of the manipulators on the component, which is known in principle from DE 10 2011 111 758.3 so that the content of this patent application is fully incorporated within the present disclosure.

The disclosure also includes a control system for a positioning system, in particular for aircraft structural assembly, the positioning system comprising a plurality of positioners which each comprise at least one manipulator, wherein during operation, the control system carries out the operating method as described herein.

The disclosure also includes a positioning system, in particular for aircraft structural assembly, the positioning system comprising a plurality of positioners which each comprise at least one manipulator. The positioning system (in particular the manipulators) is configured such that, during operation, it carries out the operating method as described herein. Alternatively or in addition, the positioning system can comprise the control system mentioned above.

BRIEF DESCRIPTION OF THE DRAWINGS

The above features and embodiments according to the present disclosure can be combined as desired. Other advantageous developments of the disclosure are included in the exemplary embodiments of the disclosure described in the claims and/or below making reference to the accompanying drawings, in which:

The embodiments described with reference to the drawings partially correspond to each other, so that similar or identical parts are provided with the same reference signs and for their description, reference is also made to other embodiments or figures in order to avoid repetition.

DETAILED DESCRIPTION

Figure 1:
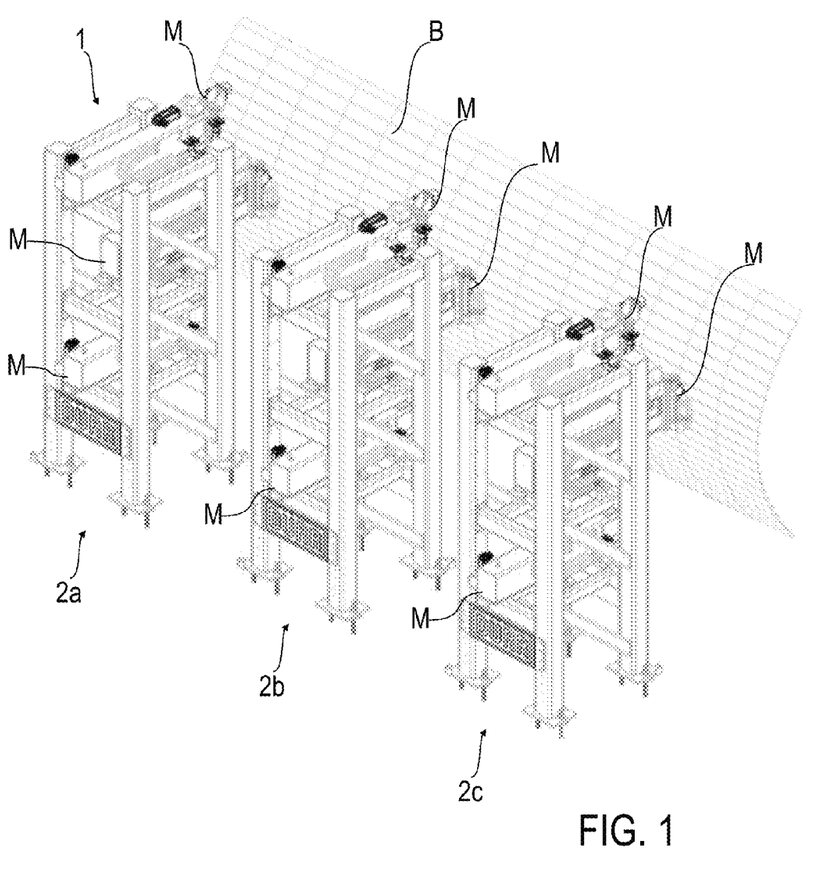
FIG. 1 shows a perspective view of a positioning system and of a component to be manipulated.

FIG. 1 shows a perspective view of a positioning system 1 according to one embodiment, which comprises a plurality of positioners 2a, 2b, 2c. Each of the positioners 2a, 2b, 2c comprises three manipulators which, for the sake of clarity, are all identified with the reference sign M. The manipulators M can have the same or different designs and are configured to grasp a component B in the form of a shell segment and to manipulate it synchronously while it is commonly grasped by the manipulators M.

The situation shown in FIG. 1 can be an initial situation of the component B in which the component B has been brought by a crane construction (not shown) before it was grasped by at least some of the manipulators M and removed.

The component B is flexionally flaccid and, in the absence of suitable countermeasures, has a deformation caused by the intrinsic weight thereof. The manipulators M are configured so as to grasp the component B in the initial situation in a desired form or, possibly, initially to manipulate the component B into a desired form in which the deformation and internal tensions caused by the intrinsic weight thereof are at least partially compensated for. The manipulators M are also configured to transport the component B in the desired form, e.g., from the initial situation into a target situation in which the component can be mounted, for example, onto another aircraft part.

The manipulators M are connected to one and the same control/computation unit and are thus controlled by one and the same control/computation unit, e.g, simultaneously.

Figure 2:
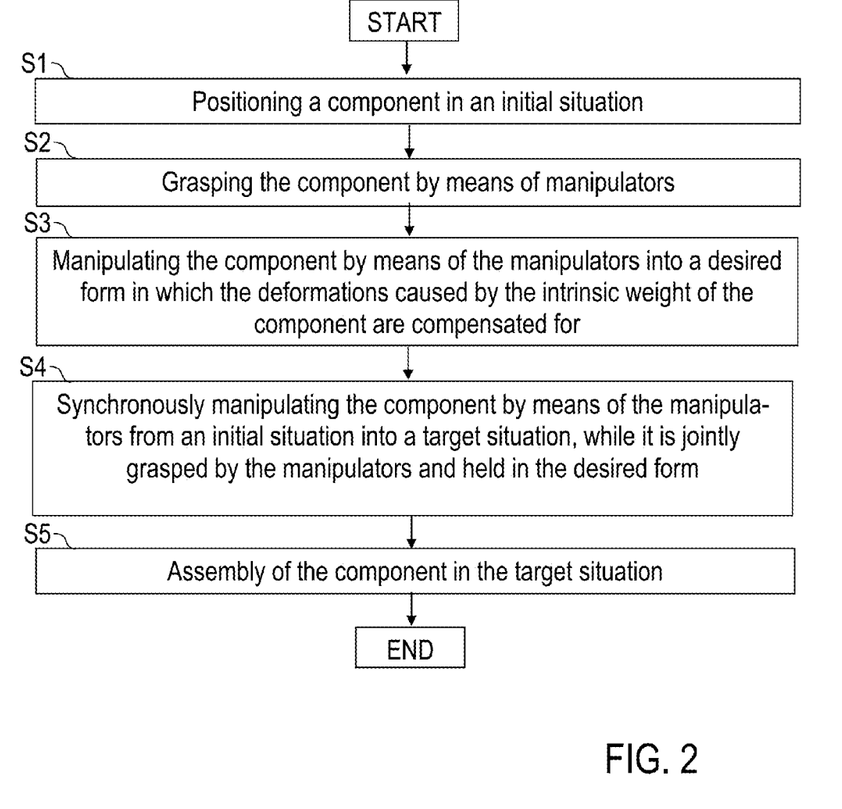
FIG. 2 shows a flow diagram of an operating method for a positioning system.

FIG. 2 shows a flow diagram of an operating method, for example, for a positioning system 1 as described by reference to FIG. 1. In particular, the flow diagram relates to an operating method for the manipulators M.

In a first step S1, a component is brought, for example, by a crane construction, into an initial situation. The component B is flexionally flaccid and, in the absence of suitable countermeasures, has deformations caused by the intrinsic weight thereof.

In a step S2, the component B is grasped by manipulators M and removed from the crane construction.

In a step S3, the component B is manipulated by the manipulators M into a desired form or is held in a desired form in which the deformations caused by the intrinsic weight of the component are compensated for.

In a step S4, the component B is synchronously manipulated by means of the manipulators M from an initial situation into a target situation, whilst being jointly grasped by a plurality of manipulators M and may be constantly held in the desired form.

In a step S5, the component B is mounted, in the target situation, onto another aircraft part.

Figure 3:
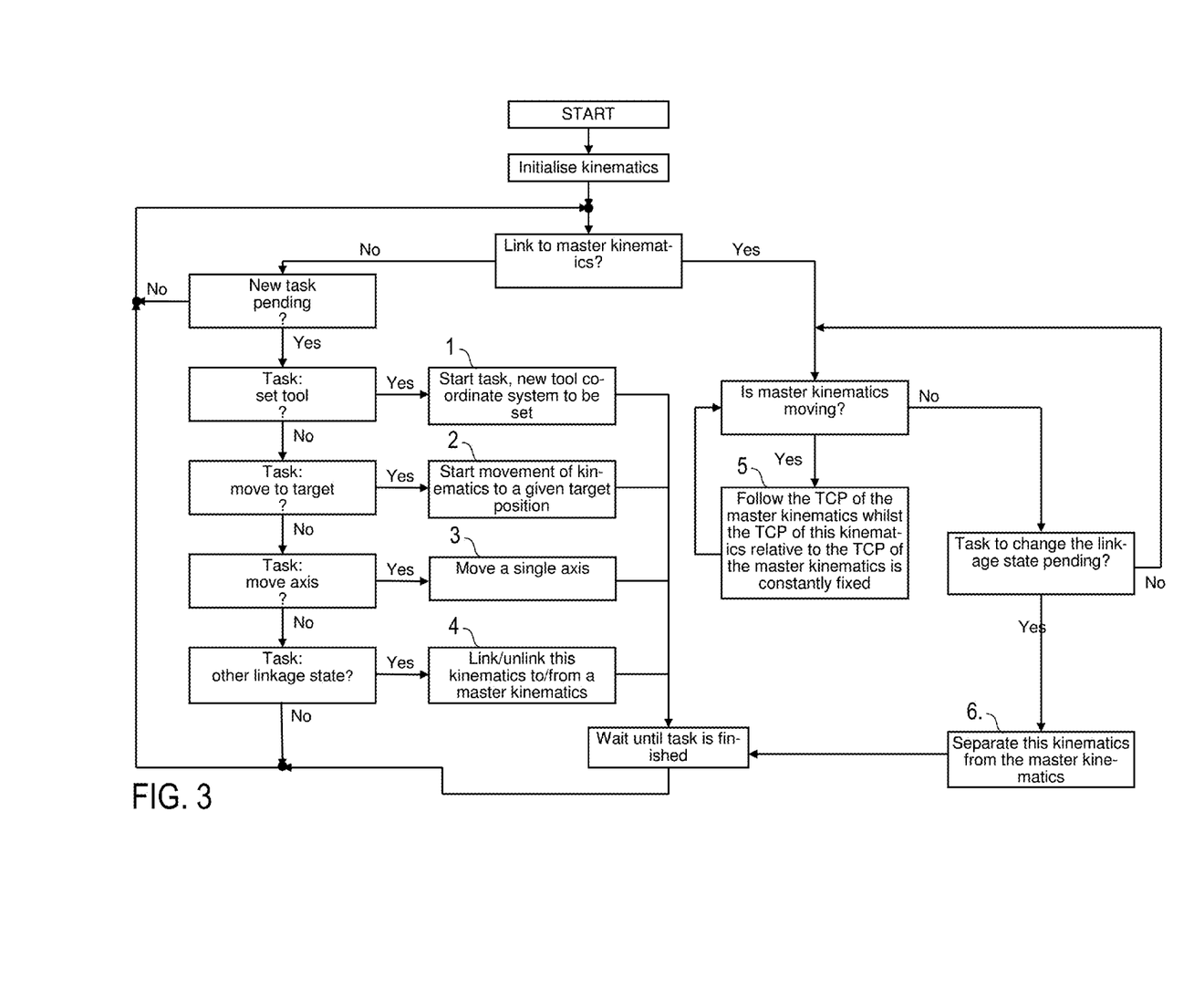
FIG. 3 shows a software flow diagram for a positioning system.

FIG. 3 shows a software flow diagram for a positioning system 1 according to one embodiment. The flow diagram relates in particular to a manipulator M and particularly to the kinematics thereof. The sequence described can also be used accordingly with the remaining manipulators M. The flow diagram is self-explanatory, so that no further description is needed at this point.

Figure 4:
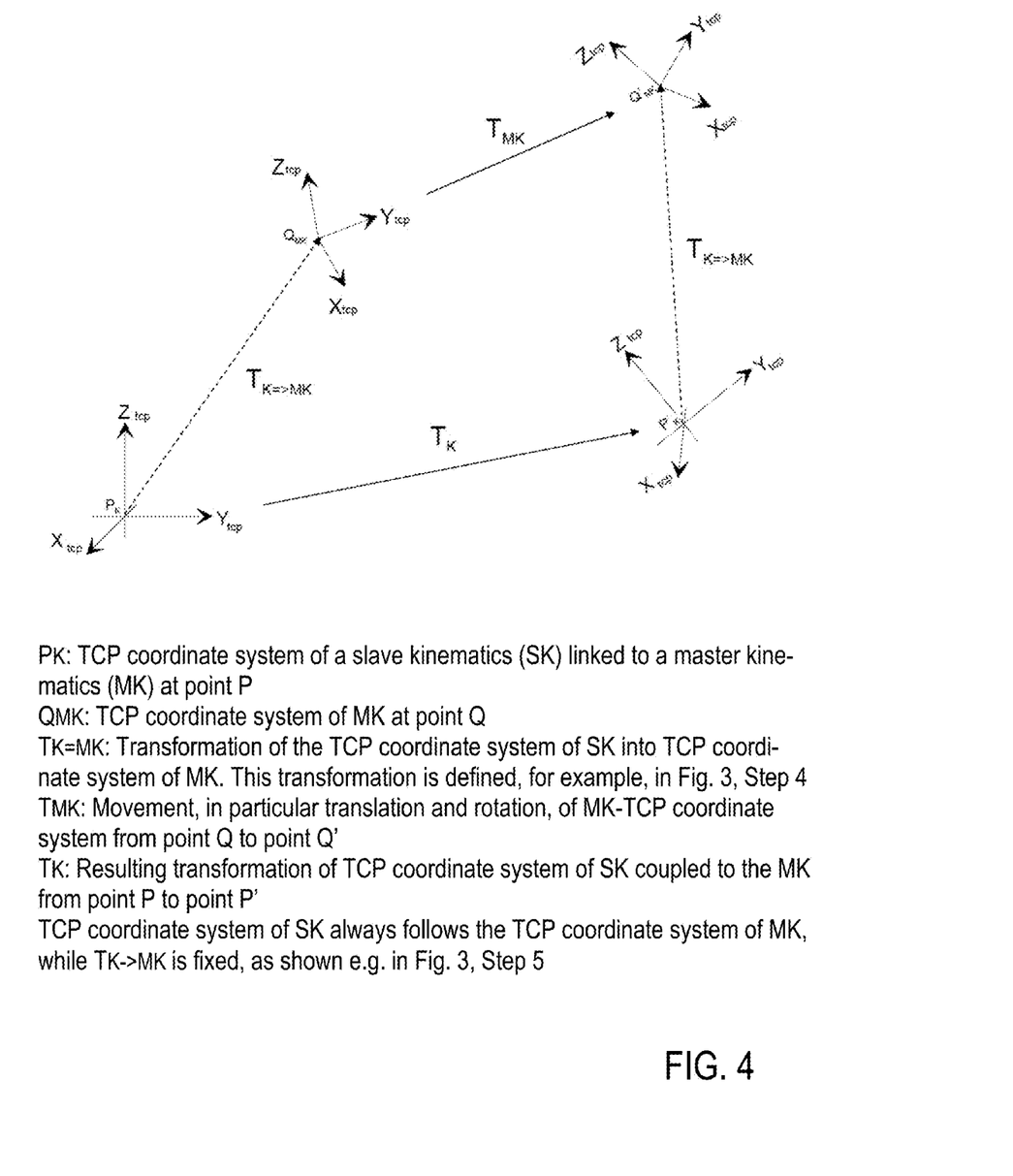
FIG. 4 shows the principle of a transformation between a master kinematics and a slave kinematics.

FIG. 4 shows the principle of a transformation between a master kinematics and a slave kinematics related to a manipulator M according to one embodiment. The principle described can also be used accordingly with the remaining manipulators M.

A master kinematics and a master coordinate system are associated with the component B, whilst a slave kinematics and a base coordinate system (slave coordinate system) are associated with the manipulator M. The master coordinate system and the slave coordinate system relate to respective reference points, in particular so-called "tool centre points" (TCP—"tool centre point" or "tool reference point") and can therefore also be designated as TCP coordinate systems.

Determined reference movement parameters, which relate to the master coordinate system and which describe the movement (e.g. travel curve, position, orientation, speed, acceleration, etc.) of the component B, are already transformed into the slave coordinate system of the manipulator M or are transformed into the slave coordinate system of the manipulator M. By this means, the manipulator M can manipulate the component B depending on the transformed reference movement parameters which now relate to the slave coordinate system of the manipulator M. It is evident that the reference movement parameters describe a master kinematics, whereas the manipulator M carries out a slave kinematics.

The slave coordinate system of the manipulator M is fixed in relation to the manipulator M, so that it moves with the manipulator M. Alternatively or in addition, the master coordinate system of the component B can be fixed in relation to the component B, so that it moves with the component B.

As FIG. 4 shows, the slave coordinate system of the manipulator M always follows the master coordinate system of the component B. In particular, the slave coordinate system of the manipulator M makes reference to and follows the master coordinate system associated with the component B, while the transformation between the manipulator M and the attachment point of the manipulator M on the component B is fixed and/or the transformation between the attachment point of the manipulator M on the component B and the master kinematics of the component B is fixed.

Figure 5:
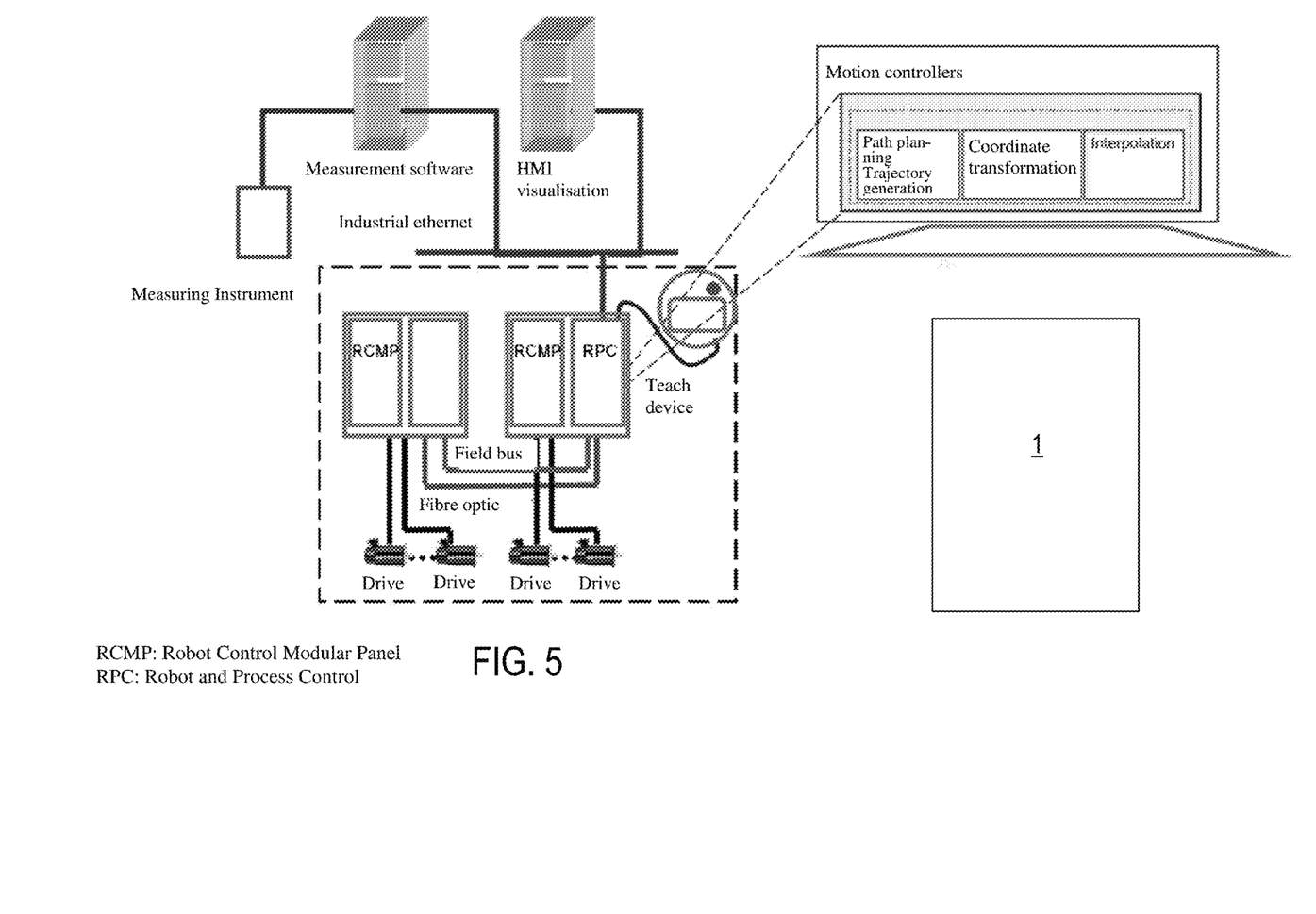
FIG. 5 shows a control architecture for a positioning system.

FIG. 5 shows a control architecture for a positioning system 1, in particular the manipulators M thereof, according to one embodiment. The control system is configured for manipulators M which have the same structures. FIG. 5 shows the control architecture of a positioning system 1, which is used, for example, for the assembly of fuselage sections from individual shell segments and floor grid. The positioning system 1 can comprise, for example, twelve Cartesian manipulators M, each having three driven axes. The control system ("motion controller") therefore contains, for example, twelve identical transformations. The control/computation unit for controlling the manipulators M is identified as RPC ("robot and process control"). RCMP ("robot control modular panel") denotes a modular control cabinet, whilst HMI denotes a "human-machine interface".

Figure 6:
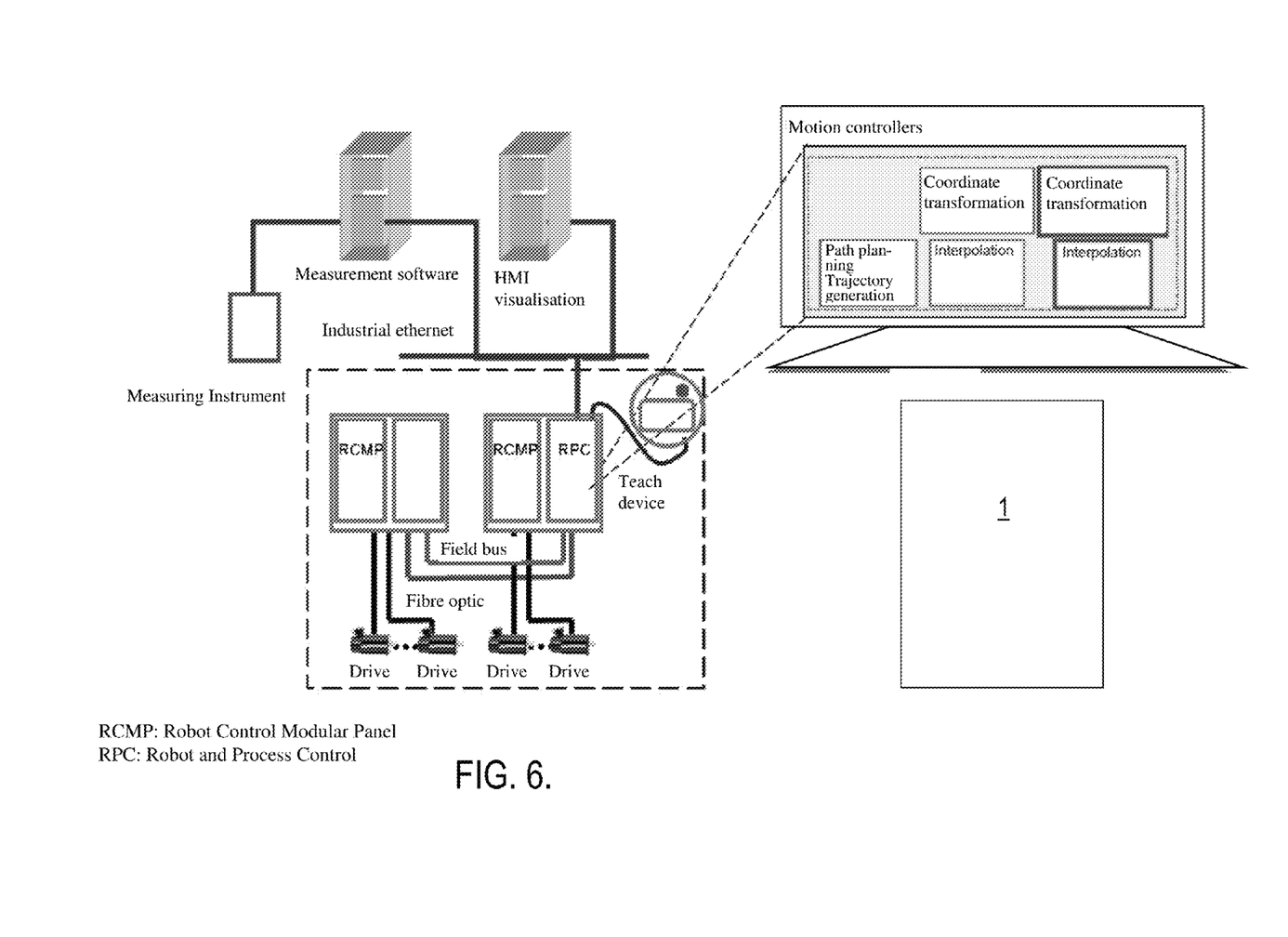
FIG. 6 shows another control architecture for a positioning system.

FIG. 6 shows another control architecture for a positioning system 1, in particular the manipulators M thereof, according to another embodiment. A particular feature of this embodiment is that the individual manipulators M have different structures. The control architecture is configured for a positioning system 1 which consists, for example, of 6 manipulators M with 18 axes. 5 of the manipulators M have, for example, a Cartesian structure, whilst the remaining manipulator M has, for example, a parallel structure.

Figure 7:
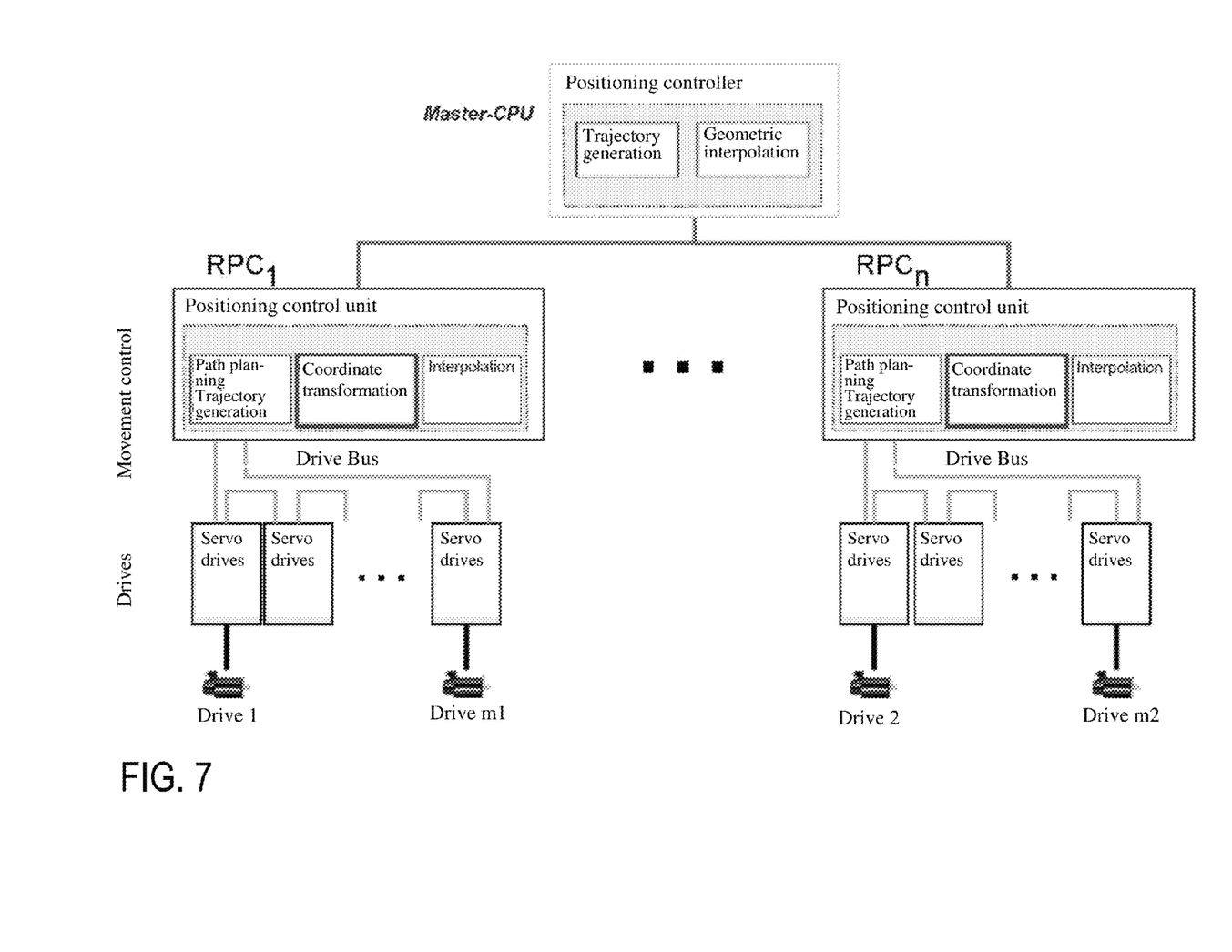
FIG. 7 shows a further control architecture for a positioning system.

FIG. 7 shows a control architecture for a positioning system 1 with a plurality of manipulators M and motion controllers according to one embodiment.

A control system is responsible for the control of systems of a plurality of manipulators M with separate motion controllers.

Each manipulator M has its own control system. Alternatively or additionally, a manipulator unit consisting of two or more manipulators M can have its own control system.

A master CPU (central processing unit) ensures the planning of the movements and/or the spatial trajectories of the individual manipulators M (in particular the manipulator TCPs thereof).

Furthermore, the master CPU is responsible, e. g, for the cycle times within which the calculated data packets are transmitted and/or for the synchronisation of the start of the movements of the manipulators M (which are communicated, for example, via I/O (input/output)).

The following claims are not restricted to the exemplary embodiments described above. Rather a plurality of variants and derivations is possible which also make use of the concept and therefore fall within the scope of the claimed invention.

The invention claimed is:

1. A method for operating a positioning system, the positioning system comprising a plurality of positioners each including at least one manipulator, wherein a respective base coordinate system is associated with each of the manipulators, the method comprising:
   grasping a single component jointly with each of the manipulators of the plurality of positioners,
   synchronously manipulating the component with the manipulators while jointly grasping the component with the manipulators,
   determining a position and an orientation of the component in an initial situation,
   determining a position and an orientation of the component in a target situation,
   determining reference movement parameters, the reference movement parameters defined relative to a coordinate system associated with the component and describing a movement of the component from the position and the orientation in the initial situation to the position and the orientation in the target situation,
   transforming the reference movement parameters into the respective base coordinate system of each of the manipulators, and
   operating the manipulators based on the respective transformed reference movement parameters.

2. The method according to claim 1, further comprising bringing the component into the initial situation by one of a holding device and a transporting device.

3. The method according to claim 1, further comprising assembling the component onto an aircraft part when the component is held in the desired form and is in the target situation.

4. The method according to claim 1, wherein the reference movement parameters describe at least one of the following:
   a movement path of the component;
   a speed of the component;
   an acceleration of the component;
   a position of the component; and
   an orientation of the component.

5. The method according to claim 1, wherein the respective base coordinate systems of the manipulators are fixed relative to respective manipulators in order to move with the respective manipulators, and the coordinate system associated with the component is fixed relative to the component in order to move with the component.

6. The method according to claim 1, wherein the respective base coordinate systems of the manipulators make reference to the coordinate system associated with the component, while at least one of the transformation between the manipulators, the attachment points of the manipulators on the component, and the transformation between the attachment points of the manipulators on the component and the master kinematics of the component defined by the reference movement parameters is fixed.

7. The method according to claim 1, wherein the manipulators are synchronously linked via a master/slave interface.

8. The method according to claim 1, wherein the manipulators are selected from the group comprising linear, serial, Cartesian and hybrid manipulators.

9. The method according to claim 1, wherein the component is a shell segment for an aircraft outer skin and the target situation of the shell segment corresponds to an assembly situation in which the shell segment is mounted.

10. A control system for a positioning system, wherein the positioning system comprises a plurality of positioners each including at least one manipulator, wherein during operation, the control system carries out the method according to claim 1.

11. A positioning system, including a plurality of positioners each including at least one manipulator,
   wherein the manipulators are configured so that, during operation, the manipulators carry out the method according to claim 1.

12. The method of claim 1, wherein the initial situation and the target situation each include at least one of a position and an orientation.

13. The method of claim 1, wherein each of the manipulators include at least two driven axes.

14. The method according to claim 1, further comprising manipulating the component with the manipulators into a desired form and holding the component in the desired form.

15. The method according to claim 14, wherein the desired form corresponds to a form in which a deformation caused by at least one of an intrinsic weight of the component and internal tensions of the component is compensated for.

16. The method according to claim 14, further comprising at least partially transporting the component with the manipulators to a target situation in the desired form.

17. The method according to claim 14, further comprising coordinately manipulating the component into the desired form with the manipulators.

18. The system according to claim 14, wherein, in an initial situation, the component is deformed by an intrinsic weight of the component.

19. The method according to claim 1, wherein the manipulators are associated with one control unit, the method further comprising controlling the manipulators by the control unit.

20. The method according to claim 19, wherein the reference movement parameters of the component and the respective transformed reference movement parameters are contained in the control unit.

* * * * *

UNITED STATES PATENT AND TRADEMARK OFFICE
CERTIFICATE OF CORRECTION

| | | |
|---|---|---|
| PATENT NO. | : 9,573,272 B2 | Page 1 of 1 |
| APPLICATION NO. | : 14/352818 | |
| DATED | : February 21, 2017 | |
| INVENTOR(S) | : Alexander Meiβner et al. | |

It is certified that error appears in the above-identified patent and that said Letters Patent is hereby corrected as shown below:

On the Title Page

The abstract should be replaced in its entirety to read as follows:

--(57) ABSTRACT
An operating method for a positioning system 1, for example, a structural assembly of aircraft, includes a plurality of positioners, each of which has at least one manipulator [[M]]. The manipulators [[M]] grasp a component [[B]] and manipulate it in a synchronized manner, while it is jointly grasped by the manipulators [[M]].--

Signed and Sealed this
Fifth Day of September, 2017

Joseph Matal
*Performing the Functions and Duties of the
Under Secretary of Commerce for Intellectual Property and
Director of the United States Patent and Trademark Office*